US006752472B2

(12) United States Patent
Bezzina

(10) Patent No.: US 6,752,472 B2
(45) Date of Patent: Jun. 22, 2004

(54) ELECTRIC PARKING BRAKE CONTROL

(75) Inventor: Christopher M. Bezzina, Tolland, CT (US)

(73) Assignee: IMI Norgren, Inc., Littleton, CO (US)

( * ) Notice: Subject to any disclaimer, the term of this patent is extended or adjusted under 35 U.S.C. 154(b) by 0 days.

(21) Appl. No.: 09/935,956

(22) Filed: Aug. 23, 2001

(65) Prior Publication Data

US 2003/0038533 A1 Feb. 27, 2003

(51) Int. Cl.[7] .............................................. B60T 13/00
(52) U.S. Cl. ........................................... 303/7; 303/20
(58) Field of Search .............................. 303/7, 9.76, 3, 303/15, 20, 71; 395/1, 164, 186; 70/239; 439/152–160

(56) References Cited

U.S. PATENT DOCUMENTS

| 3,109,906 | A | * | 11/1963 | Abendroth | ................... | 335/157 |
| 3,681,735 | A | * | 8/1972 | Masuda et al. | ................. | 335/1 |
| 4,095,213 | A | * | 6/1978 | Hayden | ....................... | 335/186 |
| 4,175,646 | A | | 11/1979 | Eikelberger | ................. | 188/156 |
| 4,433,763 | A | | 2/1984 | Lizzio | ......................... | 192/4 A |
| 4,550,953 | A | * | 11/1985 | Bartholomew | .............. | 303/15 |
| 4,726,277 | A | * | 2/1988 | Peterson et al. | ............ | 335/164 |
| 4,763,959 | A | * | 8/1988 | Vandemotter | ................ | 303/63 |
| 4,871,989 | A | * | 10/1989 | Gross | .......................... | 335/263 |
| 4,873,824 | A | | 10/1989 | Cox | ............................ | 60/545 |
| 4,893,101 | A | * | 1/1990 | Robitaille | .................... | 335/164 |
| 5,061,015 | A | * | 10/1991 | Cramer et al. | ................ | 303/15 |
| 5,370,449 | A | | 12/1994 | Edelen et al. | ................... | 303/3 |
| 5,520,446 | A | * | 5/1996 | Wilson et al. | .............. | 188/170 |
| 5,704,693 | A | | 1/1998 | Mackiewicz | .................... | 303/3 |
| 5,897,173 | A | | 4/1999 | Hardin | .......................... | 303/3 |
| 6,019,436 | A | | 2/2000 | Siepker | ........................ | 303/13 |
| 6,139,117 | A | | 10/2000 | Shirai et al. | .................... | 303/3 |
| 6,322,159 | B1 | * | 11/2001 | Eberling | ................ | 188/1.11 R |
| 6,382,741 | B1 | * | 5/2002 | McCann et al. | ............ | 188/265 |

OTHER PUBLICATIONS

Title 49—Transportation, Chapter V—National Highway Traffic Safety Administration, Department of Transportation, 49 CFR 571.121, pp. 377–400, revised as of Oct. 1, 2000.

* cited by examiner

Primary Examiner—Robert Siconolfi
(74) Attorney, Agent, or Firm—Sheridan Ross P.C.

(57) ABSTRACT

A brake control method and apparatus capable of locating fluid carrying lines away from a vehicle dash and providing threshold pressure detection is provided. The apparatus includes an electric switch assembly which can have portions that are mounted in the vehicle cab. A pressure switch subassembly and a control subsystem electrically communicate with the electric switch assembly. The electric switch assembly provides electrical current to a solenoid in the control subsystem, opening a pneumatic valve and providing air pressure to other components of the control subsystem and a brake release actuator. If electrical current is removed from the solenoid in the control subsystem, the pneumatic valve is closed, removing air pressure from other components of the control subsystem and the brake release actuator. If less than a threshold pressure is detected at the pressure switch subassembly, the electric switch assembly does not provide electrical current to the control subsystem.

14 Claims, 4 Drawing Sheets

ELECTRIC PARKING BRAKE CONTROL

FIELD OF THE INVENTION

The present invention relates to pneumatic brake systems, and, more specifically, to control valves used in such systems and electronic switches to activate the control valves.

BACKGROUND OF THE INVENTION

The majority of current heavy vehicle brake systems use compressed air to apply the brakes. Control signals are transmitted from the driver of the vehicle to the control valves of the brake system, and the brakes are applied. Brakes are generally divided into two categories, service brakes and parking brakes. Service brakes are used primarily to slow the vehicle to a stop when the vehicle is moving. Parking brakes are used primarily for helping to prevent the vehicle from moving from a parked position, and may also be used in an emergency situation to slow a moving vehicle when the service brakes have failed to provide a redundant brake circuit.

For service brakes, an operator generally depresses a brake pedal, which in turn actuates a control valve, allowing air pressure to travel to the brake, and the brake is applied. The parking brake is generally engaged by a vehicle operator by actuating a push/pull hand lever within the cab of the vehicle, located on the vehicle dash. The parking brake is generally a spring brake which is normally engaged, meaning that air pressure must be applied to the parking brake in order to release it. Thus, when there is no air pressure present, the parking brake is applied. Accordingly, if a vehicle loses air pressure (i.e., ruptured hose, failed component, etc.), and thus loses service brake airpressure (e.g., <30–35 psi) and the ability to apply the service brakes, the parking brake will automatically engage, and act to slow a moving vehicle. Likewise, when the vehicle is parked and/or not in use, the parking brake can be engaged by the operator, helping to prevent the vehicle from moving from a parked position.

As mentioned above, typical current day heavy vehicles have a push/pull knob located in the cab of the vehicle which is used to engage and disengage the parking brake. A vehicle may have more than one push/pull knob, depending upon whether there is an additional control for the parking brakes on a trailer attached to the vehicle. The push/pull knob is generally connected to a control valve, which controls the flow of air to the parking brake. Generally, when an operator pushes the valve in, it acts to provide air pressure to the parking brake, and thus release the brake, allowing the vehicle to move. In order to apply the brake, the operator pulls the push/pull knob, thus removing air pressure from the parking brake and causing it to engage. When the knob is pushed in, the air pressure acts to engage the knob and keep it in the pushed in position. Such push/pull knobs also have a feature which allows a manual override where, even if there is a failure in the air system, or the air pressure is not high enough to engage the push/pull knob, the operator may manually hold the knob in to disengage the parking brake and move the vehicle a short distance.

While this is a relatively simple system, it can have disadvantages. For example, because air lines are routed to and from the switch in the dash of the vehicle, the dash must be relatively large, to accommodate the air hoses. Additionally, it can be difficult to install the valve and associated air hoses, because of the tight area in which they go behind the dash. Furthermore, maintenance can be difficult in a case where there is an air leak in the valve or associated hoses. The air leak can be difficult to find and repair due to the restricted area of the dash.

SUMMARY OF THE INVENTION

In accordance with the present invention, an apparatus for controlling at least one park brake in a vehicle is provided. The apparatus includes an electric switch assembly, which can, but need not, have at least portions that are mounted in the vehicle dash. The electric switch assembly can be manually controlled between first and second positions by the vehicle operator including related to controlling a park brake function. A pressure switch subassembly communicates with the electric switch assembly. The pressure switch subassembly has a first state and a second state. The pressure switch subassembly can be in the first state when at least a threshold pressure is detected and can be in the second state when less than the threshold pressure is detected. The apparatus includes a brake release actuating subsystem including at least one park brake release actuator. The apparatus also includes a control assembly in communication with each of the electric switch assembly and pressure switch subassembly that controls the application of fluid to the at least one park brake release actuator.

The electric switch assembly can be a solenoid actuator assembly that includes a solenoid actuator push/pull knob and switch contacts. The solenoid actuator push/pull knob is in a first position and the switch contacts are in a first state when the park brake is released and the solenoid actuator push/pull knob is in a second position and the switch contacts are in a second state when the park brake is applied. The solenoid actuator push/pull knob can be in the second position when less than the threshold pressure is detected by the pressure switch subassembly. The solenoid actuator assembly can include a return spring for use in providing the solenoid actuator push/pull knob in the second position.

The control assembly can also include a solenoid pilot valve subassembly and an electrical conductor connected between the electric switch assembly and the solenoid pilot valve subassembly and in which electrical power is supplied to the solenoid pilot valve subassembly using the electrical conductor. The control apparatus can include a relay valve subassembly in fluid communication with the solenoid pilot valve subassembly and which the relay valve subassembly is also in fluid communication with the pressure switch subassembly. The relay valve subassembly can include an output applied to the at least one park brake release actuator.

A vehicle having the apparatus including the control assembly can include at least one park brake fluid carrying line and an electrical conductor connected to the electric switch assembly. The electrical conductor can originate from the vehicle dash or the vehicle cab. The at least one park brake fluid carrying line can be located away from the vehicle dash or the vehicle cab and on the vehicle chassis. One or both of the vehicle cab and the vehicle dash can be free of any fluid carrying line used by the apparatus.

The present invention also provides a method for controlling at least one park brake system in a vehicle. The method includes providing an apparatus that includes an electrical switch assembly and a pressure switch subassembly in communication with the electric switch assembly. The pressure switch assembly detects whether a threshold pressure exists related to a fluid system of the vehicle. The electric switch assembly can be changed between a first position and a second position, depending on the threshold pressure, to release the at least one park brake system.

The park brake system can be applied when the pressure switch subassembly detects a pressure less than the threshold pressure. The park brake system could be applied by causing the electric switch assembly to change to the second position. The apparatus can include a pilot solenoid valve subassembly that de-energizes when the electric switch assembly is in the second position. The pilot solenoid valve subassembly might fluidly communicate with a relay valve subassembly and the relay valve subassembly can be used to interrupt fluid delivery to the park brake system.

The electric switch assembly can be manually controlled while the pressure switch subassembly is detecting a pressure greater than the threshold pressure. The park brake could also be released by manually controlling the electric switch assembly when the pressure switch subassembly detects a pressure less than the threshold pressure.

All fluid associated with the apparatus can be located away from the vehicle dash. At least portions of the electric switch assembly could be mounted to the vehicle dash. The electric switch assembly, in such a case, includes at least a first electrical conductor that extends from the vehicle dash.

Based on the foregoing, several advantages of the present invention are readily seen. The method and apparatus provide the ability to locate all fluid carrying lines away from the vehicle dash and/or inside the vehicle cab, thus allowing for easier installation and maintenance of the operator actuated electric switch. Additionally, the vehicle dash may be smaller due to not having to locate fluid lines behind the dash. Furthermore, the invention can include a unique combination of electric switch, pressure switch and control for desired automation or semi-automatic operations.

Additional advantages will be seen when reading the following description of the invention, particularly when taken in conjunction with the accompanying drawings.

DETAILED DESCRIPTION

Figure 1:
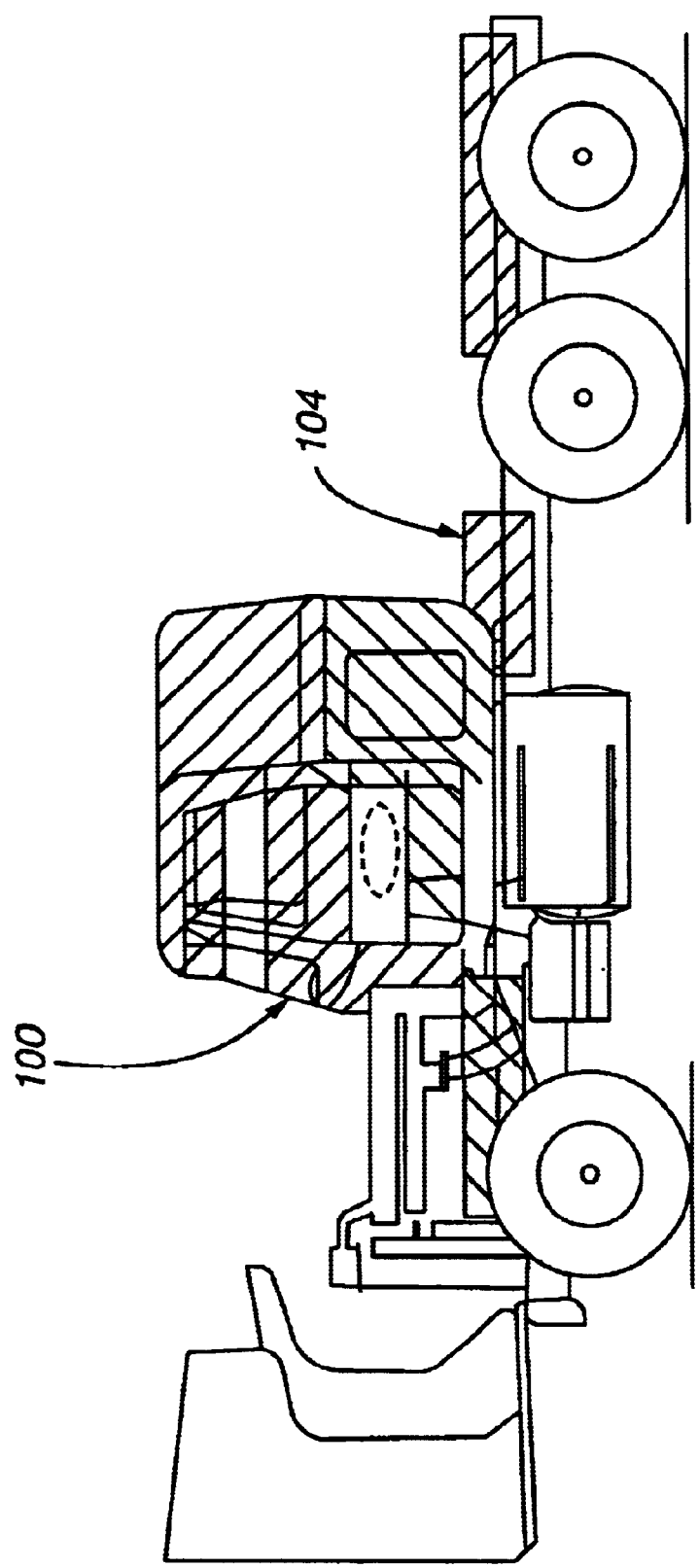
FIG. 1 is a perspective illustration of a semi tractor.

Referring to FIG. 1, a semi-tractor is illustrated. In accordance with one embodiment of the present invention, a brake control apparatus is provided which has portions located in the vehicle cab 100, at the dash of the vehicle, and portions located outside of the vehicle cab 100 on the vehicle chassis 104. Preferably, fluid connections for the brake assemblies are located on the vehicle chassis 104, and are not routed into the vehicle cab 100. In this manner, the fluid lines, typically pneumatic lines, are less susceptible to leaks from the routing in and through the vehicle cab 100. Furthermore, the vehicle dash may be made smaller due to not having to route pneumatic lines behind the vehicle dash, thereby increasing visibility from within the cab 100 and simplifying the assembly of the dash.

Figure 2:
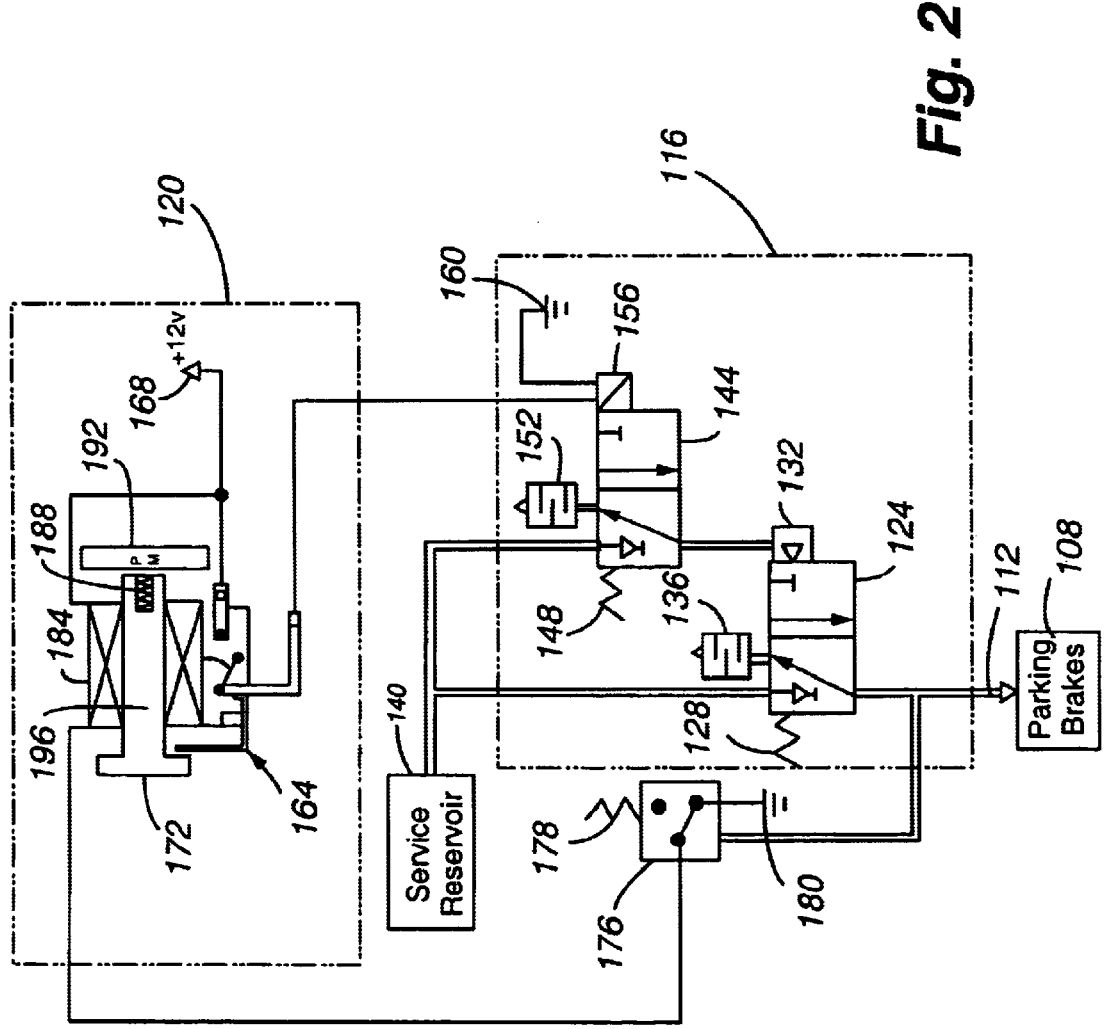
FIG. 2 is a schematic representation of one embodiment of the park brake system of the present invention.

Referring now to FIG. 2, a schematic diagram representing one embodiment of the present invention is now described. The park brakes 108 are of the type commonly found on such vehicles. The park brakes 108 are spring brakes and are in a normally engaged position, requiring pneumatic air pressure to release the park brakes 108. The pneumatic air pressure is supplied to the park brakes 108 through a pneumatic line 112. The pneumatic pressure is provided by a control assembly 116 located on the vehicle chassis 104. The control assembly 116 is in communication with an electric switch assembly 120 located on the vehicle dash. The air pressure in the pneumatic line 112 comes from a relay valve 124 located within the control assembly 116. The relay valve 124 is a normally closed pneumatic valve which includes a spring 128, an air pilot 132, and an exhaust protection 136. The spring 124 acts to keep the valve in a closed position, and when the air pilot 132 receives air pressure, the pressure overcomes the bias of the spring 128 and opens the relay valve 124 creating air pressure in the pneumatic line 112, and releasing the park brakes 108. The pneumatic input to the relay valve 124 is connected to a service reservoir 140, which provides air pressure to the relay valve 124.

The air pilot 132 is connected to a solenoid pilot valve 144, which is a normally closed pneumatic valve, which includes a spring 148, an exhaust protection 152, and a solenoid 156. The solenoid 156 is electrically connected to a ground 160, and to a switch 164 located in the electric switch assembly 120. The switch 164 in this embodiment is a normally open snap switch, which can be switched between a 12 V DC supply 168 and an open circuit. Thus, when the switch 164 is connected to the 12 V DC supply 168, a current is induced in the solenoid 156, resulting in a magnetic field which acts to actuate the solenoid pilot valve 144. It should be noted that the level of the voltage may be different than 12 V DC, so long as a magnetic field is induced to actuate the solenoid pilot valve 144. The pneumatic input to the solenoid pilot valve 144 is also connected to the service reservoir 140, thus, when the solenoid pilot valve 144 is actuated, air pressure is delivered to the air pilot 132 of the relay valve 124.

The switch 164 is actuated by a manually operated push/pull knob 172. The push/pull knob 172 is operated by an operator of the vehicle, and is pushed in to release the park brakes 108, and pulled out to engage the park brakes 108. When an operator pushes in the push/pull knob 172, it closes the switch 164, which provides voltage from the 12 V DC supply to the solenoid 156, and actuates the solenoid pilot valve 144, thus providing air pressure to the air pilot 132 of the relay valve 124. The relay valve 124 is thus actuated, and air pressure is supplied to the park brakes 108.

Also connected to the pneumatic line 112 is a pneumatic pressure switch 176. As mentioned above, the service brakes on these types of vehicle are also engaged using pneumatic air pressure. Accordingly, a sufficient amount of air pressure is required to operate the service brakes. Thus, if air pressure drops below a threshold pressure in the system, the service brakes will not operate, and the park brakes 108 will automatically engage, because air pressure is required from the relay valve 124 to keep the park brakes 108 disengaged. However, a situation may arise where there is sufficient air pressure to keep the park brakes 108 released, but may not be enough to properly operate the service brakes. In this situation, the operator may depress the push/pull knob 172 and hold it in this state to be able to move the vehicle for a short distance. In order to avoid such a situation, the pressure switch 176 is operable to monitor for a loss of air pressure. The pressure switch 176 in this embodiment is connected to the pneumatic line 112 at the output of the relay valve 124. Alternatively, the pressure switch 176 could be located upstream of the relay valve 124. The pressure switch 176 is contains a normally closed electrical switch and includes a spring 178, and is connected to a pressure switch ground 180. Pressure in the pneumatic line 112 is received at the pressure switch 176 and, if the pressure is sufficiently high enough, overcomes the spring 178 bias moving an electrical contact within the pressure switch 176 to an open position away from the pressure switch ground 180. If the pressure in the pneumatic line 112 drops below a threshold pressure, the pressure switch 176 closes the electrical contact to a pressure switch ground 180. In one embodiment, this threshold pressure is 30 psi.

When the pressure switch 176 closes the electrical contact to the pressure switch ground 180, a circuit is completed between the 12 V DC supply 168 and the pressure switch ground 180. This results in a current flowing through a coil 184 in the push/pull knob 172. In this embodiment, the push/pull knob 172 includes a permanent magnet latching solenoid, which has a spring 188 and a permanent magnet 192. When the push/pull knob 172 is pushed in, the shaft 196 of the push/pull knob 172 is held in place by the magnetic force of the permanent magnet 192. However, when a current is flowing through the coil 184 associated with the push/pull knob 172, the magnetic force created by the flowing current is enough to overcome the force from the permanent magnet 192, and the push/pull knob 172 is forced back into the out position by the spring 188. When this happens, the switch 164 is also opened, thus removing any power supplied to the solenoid 156. As a result, the solenoid pilot valve 144 returns to its normally closed position, removing any air pressure from the air pilot 132 on the relay valve 124, in turn causing the relay valve 124 to return to its normally closed position, and removing air pressure from the park brakes 108, thus applying them.

During operation, when an operator of a vehicle starts a parked vehicle, the park brakes 108 will be engaged, and sufficient air pressure may not be present when the vehicle is not running. Once the vehicle is running, the air system will reach normal operating pressure unless there is a malfunction in the air system, as will be discussed in more detail below. With the vehicle running, when the operator wants to move the vehicle, the push/pull knob 172 is manually pushed in, resulting in the switch 164 closing its contact to the 12 V DC supply 168. This results in the solenoid 156 opening the solenoid pilot valve 144. The output of the solenoid pilot valve 144 actuates the pilot 132, and opens the relay valve 124. The output of the relay valve 124 disengages the park brakes 108, and also opens the pressure switch 176 contact if sufficient pressure is present at the pneumatic line 112. When the pressure switch 176 contact is open, no current flows through the coil 184 in the push/pull knob 172, and the permanent magnet 192 holds the push/pull knob 172 in the "in" position. If the operator wishes to apply the park brakes 108 at a later time, the push/pull knob 172 may be pulled back out, thus opening the contact in the switch 164, which results in the solenoid pilot valve 144 and the relay valve 124 closing and removing air pressure from the park brakes 108.

If the air pressure in the pneumatic line 112 drops below, or does not attain, the threshold pressure, the pressure switch 176 contact will close to the pressure switch ground 180. This results in current flowing through the coil 184 in the push/pull knob 172, and the push/pull knob 172 is forced away from the permanent magnet 192 and the contact in the switch 164 is opened, resulting in the park brakes 108 being applied. If the operator wishes to move the vehicle when there is a low air pressure situation, the push/pull knob 172 may be manually held in the "in" position, closing the contact in the switch 164 and opening the solenoid pilot valve 144 and relay valve 124. Such a situation may arise, for example, if there is an air leak in the pneumatic line 112 which results in the pressure dropping below the threshold pressure. Even with the air pressure below the threshold pressure, it may still be high enough to release the park brakes 108. In this situation, an operator would not want to operate the vehicle for a long distance due to the air leak, but may want to operate the vehicle for a short distance in order to move the vehicle to a safe location, or a location where maintenance can be performed. Thus, with the push/pull knob 172 being manually held in by the operator, the vehicle may be moved this short distance.

Figure 3:
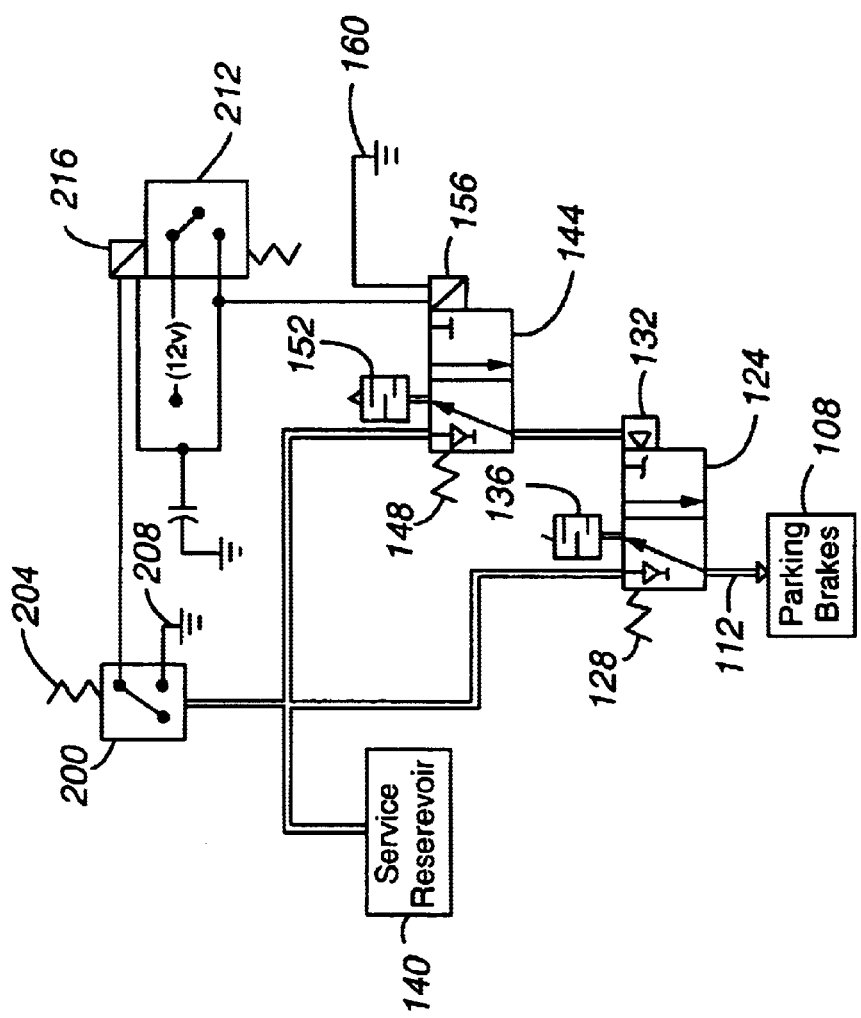
FIG. 3 is a schematic representation of a second embodiment of the park brake system of the present invention.

With reference now to FIG. 3, another embodiment of the brake control apparatus is now described. In this embodiment, the solenoid pilot valve 144 and relay valve 124 act in the same manner to provide air pressure to the park brakes 108 as described above with respect to FIG. 2. In this embodiment, a normally open pressure switch 200 monitors the air pressure at the service reservoir 140. The pressure switch 200 contains a spring 204, and connects an electrical switch to a pressure switch ground 208 if at least a threshold pressure is present. Additionally, in this embodiment, the electric switch assembly 212 has a solenoid actuator 216 which receives its ground through the pressure switch 200. If the air pressure in the system is greater than a threshold pressure, 30 psi in one embodiment, the solenoid actuator 216 is energized and holds the switch contacts closed, thus sending power and energizing the solenoid 156.

Figure 4:
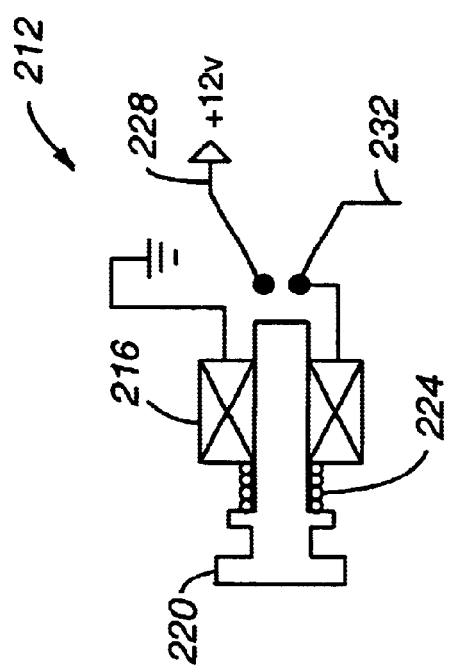
FIG. 4 is a schematic representation of a switch assembly of one embodiment of the present invention.

Referring now to FIG. 4, a more detailed illustration of the electric switch assembly 212 is now described. The electric switch assembly 212 in this embodiment includes a push/pull knob 220, and a return spring 224. When the push/pull knob 220 is pushed in, it completes an electrical connection between a 12 V DC supply contact 228 and an output contact 232. As described above, the solenoid actuator 216 receives its ground through the pressure switch 200. Referring to FIGS. 3 and 4, if the air pressure at the pressure switch 200 drops below the threshold pressure, the pressure switch 200 opens, and the solenoid actuator 216 loses its ground. Thus, the push/pull knob 220 is forced out by the force of the return spring 224, and opens the switch contacts 228, 232. When this occurs, the solenoid 156 on the solenoid pilot valve 144 is de-energized, closing the solenoid pilot valve 144 and removing air delivery to the pilot 132 on the relay valve 124, closing delivery of air to the park brakes 108. The operation of the system is the same as described above, with the operator manually moving the push/pull knob 220 to engage and release the park brakes 108.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best modes presently known of practicing the inventions and to enable others skilled in the art to utilize the inventions in such, or in other embodiments, and with the various modifications required by their particular application or uses of the invention. It is intended that the appended claims be construed to include alternative embodiments to the extent permitted by the prior art.

What is claimed is:

1. An apparatus for controlling at least one park brake in a vehicle, comprising:

an electric switch assembly;

a pressure switch subassembly communicating with said electric switch assembly, said pressure switch subassembly being associated with at least first and second states, said pressure switch subassembly being in said first state when at least a threshold pressure is detected and said pressure switch subassembly being in said second state when less then said threshold pressure is detected, wherein said pressure switch subassembly controls said electric switch assembly, at least when a pressure less than said threshold pressure is detected and said pressure switch subassembly changes from said first state to said second state such that the at least one park brake is applied; and a control assembly in communication with each of said electric switch assembly and said pressure switch subassembly that controls application of fluid to the at least one park brake;

wherein said electric switch assembly includes a push/pull knob that is in a first position when said pressure switch subassembly detects a pressure less than said threshold pressure and said push/pull knob is in a second position when at least said threshold pressure is detected and in which said push/pull knob is manually controlled from said first position to said second position when said pressure switch subassembly detects a pressure less than said threshold pressure in order to release the at least one park brake, and wherein said push/pull knob is held by an operator in said second position and, when the operator discontinues holding said push/pull knob in said second position, the at least one park brake is not released.

2. An apparatus as claimed in claim 1, wherein:

said electric switch assembly is a solenoid actuator assembly that includes a push/pull knob and switch contacts, said push/pull knob being in a first position and said switch contacts being in a first state when the at least one park brake is released and said push/pull knob being in a second position and said switch contacts being in a second state when the at least one park brake is applied.

3. An apparatus, as claimed in claim 2, wherein:

said push/pull knob is in said second position when less than said threshold pressure is detected by said pressure switch subassembly.

4. An apparatus, as claimed in claim 2, wherein:

said solenoid actuator assembly includes a return spring for use in providing said push/pull knob in said second position.

5. An apparatus, as claimed in claim 2, wherein:

said push/pull knob can be engaged by the vehicle operator to provide a selected one of the at least one park brake being applied and the at least one park brake being released.

6. An apparatus, as claimed in claim 1, wherein:

said control assembly includes a solenoid pilot valve subassembly and an electrical conductor connected between said electric switch assembly and said solenoid pilot valve subassembly and in which electrical power is supplied to said solenoid pilot valve subassembly using said electrical conductor.

7. An apparatus, as claimed in claim 1, further including:

a vehicle including a cab having said apparatus and wherein said control assembly includes at least a park brake fluid carrying line and an electrical conductor connected to said electric switch assembly and in which said electrical conductor originates from the vehicle cab and said park brake fluid carrying line is located away from said vehicle cab and adjacent to the vehicle chassis.

8. An apparatus, as claimed in claim 7, wherein:

the vehicle dash is free of any fluid carrying line used by said apparatus.

9. A method for controlling at least one park brake system in a vehicle, comprising:

providing an apparatus that includes an electric switch assembly and a pressure switch subassembly in communication with said electric switch assembly for detecting whether a threshold pressure exists related to a fluid system of the vehicle, said electric switch assembly including a push/pull knob;

changing said electric switch assembly from a first position to a second position when at least said threshold pressure is detected to release the at least one park brake system;

applying the at least one park brake system when said pressure switch subassembly detects a pressure less than said threshold pressure and in which said electric switch assembly changes from said second position to said first position; and moving manually said push/pull knob from said first position to said second position after said pressure switch subassembly detects said pressure less than threshold pressure in order to release the at least one park brake system; and holding said push/pull knob in said second position, wherein during said holding at least the one park brake system is released and when said holding is discontinued the at least one park brake system is not released.

10. A method, as claimed in claim 9, wherein:

said apparatus includes a solenoid pilot valve subassembly fluidly communicating with a relay valve subassembly and in which said relay valve subassembly is used to interrupt fluid delivery to the at least one park brake system.

11. A method, as claimed in claim 9, wherein:

the vehicle includes a vehicle cab and vehicle dash and further including locating all fluid carrying lines associated with said apparatus away from the vehicle cab.

12. A method, as claimed in claim 11, wherein:

mounting at least portions of said electric switch assembly in the vehicle cab and in which said electric switch assembly includes at least a first electrical conductor that extends from the vehicle cab.

13. A method, as claimed in claim 9, wherein:

said applying includes supplying a current to said electric switch assembly, said current causing said push/pull knob to change to said first position.

14. A method, as claimed in claim 13, wherein:

after said moving, said push/pull knob is in said second position and said holding maintains said second position while said current is being supplied.

* * * * *